INVENTORS
JOSEPH A. MAGDA
BRUCE B. SCHWAB
BY Nilsson, Robbins & Anderson
—ATTORNEYS—

INVENTORS
JOSEPH A. MAGDA
BRUCE B. SCHWAB

By Nilsson, Robbins & Anderson
ATTORNEYS

United States Patent Office 3,448,621
Patented June 10, 1969

3,448,621
ELECTRIC GATING SYSTEM TO ELIMINATE CONTACT INTERFERENCE
Joseph A. Magda, Garden Grove, and Bruce B. Schwab, Inglewood, Calif., assignors, by mesne assignments, to McDonnell Douglas Corporation, Santa Monica, Calif., a corporation of Maryland
Filed Mar. 23, 1966, Ser. No. 536,875
Int. Cl. G01p 15/08
U.S. Cl. 73—517           7 Claims

ABSTRACT OF THE DISCLOSURE

A digital accelerometer is disclosed wherein an acceleration force proportionately positions a wiper arm contact on one of a set of stationary contacts. Each stationary contact is coupled to a source of regulated current which is supplied through the wiper contact and a filter (to eliminate contact filter) to activate a pulse generator. The output of the pulse generator is applied through the wiper contact and one of the stationary contacts to activate a digital stage associated with the stationary contact.

---

This invention relates generally to systems for electric gating and more particularly to such gating systems which eliminate electrical contact vibration interference.

Although the present invention finds particularly advantageous application in the field of aircraft structure service life monitoring and structural stress analysis studies, and although in the cause of brevity and clarity of presentation, much of the following discussion of examples of the invention is directed thereto, it is to be expressly understood that the advantages of the invention are equally well manifest in other fields wherein the handling of multi-valued or analog varying signals is desired such as, for example, electro mechanical systems in which electrical threshold signals representing conditions or events of different predetermined weights or values are summed to provide an integral value, the total magnitude of which accounts for a summation of the different components properly weighted.

In the field of air frame fatigue monitoring and analysis, the service life of the structural, metal members such as, for example, a wing spar or a nacelle supporting strut, is directly affected not only by a number of flexing strains suffered thereby, but also by their magnitudes; i.e., the member may suffer the same given degree of structural fatigue after experiencing either a large number of low magnitude strains or a small number of high magnitude strains, or, more pertinently, any of a larger number of different combinations (summations) of strains of different magnitudes.

It is therefore highly desirable to have available instrumentation which is capable of measuring and recording all different magnitudes of stresses suffered by the structure to be observed. The recorded data may then be analyzed to determine the degree of fatigue experienced by the structure.

In the past, such apparatus has been so bulky and massive as to be difficult or impossible in many instances to install for an application where the indicated strain analysis or monitoring would otherwise be desirable. In addition, such prior art systems have typically been so complex, either electrically or mechanically or both, as to suffer severe limitations in reliability in instrument system lifetime. Other aspects of some of the prior art apparatus include short lifetime because of accelerometer contact deterioration due to high current flow therethrough or electron device burnout due to conventional circuit approaches which typically require vacuum tube grid current or transistor base current for charging certain coupling capacitors in the process of filtering the accelerometer output. These latter difficulties arise in the prior art particularly with the approach of using a multi-contact accelerometer to distribute signal current from its source to particular counter or recording devices.

Still other disadvantages of the prior art devices stem from their inability to avoid ambiguous readings due to sensor armature vibrations superimposed upon its displacement due to loading stresses on the structure being tested or monitored.

Accordingly, it is an object of the present invention to provide an electric gating network which is not subject to these and other limitations and disadvantages of the prior art.

It is another object to provide such a network which eliminates multiple transients and other interference due to contact vibration.

It is another object to provide a summation system incorporating such a network which automatically gives a predetermined weighting to different signals in accordance with the value of the condition or event which they represent.

It is another object to provide such a system which utilizes a multi-contact accelerometer having a minimum number of contact points and which has a long useful life.

It is another object to provide such a summation system the signals from which are positive and non-ambiguous and which is in all other respects exceedingly accurate and reliable.

It is another object to provide such apparatus which may readily occupy a total of less than 8 cubic inches and which may be placed in or upon structural members without structurally affecting those members and which is rugged and low in cost.

It is another object to provide such a system the output indications from which may be instantly interpreted without further computation or analysis.

Very briefly, these and other objects are achieved in one example of the invention which includes an accelerometer having a plurality of stationary contacts which are brushed by a wiper arm contact elastically suspended from the frame of the accelerometer. At a given time, a particular one of the stationary contacts is contacted by the wiper arm contact depending upon the magnitude of acceleration being suffered at that time by the member upon which the instrument is mounted.

Each of the stationary contacts is connected to a direct current voltage signal source through an isolating resistor so that when any one of the contacts is brushed by the wiper arm contact, a low voltage, with very low current, signal is impressed thereupon.

The contact signal is coupled to a filter circuit which removes vibrational contact noise and other spurious signals and then impresses the resulting slow rise time step function signal to a pulse generating network. The latter is of the character to output a strong, narrow pulse through an isolating capacitor back to the wiper arm, and thence to a particular stationary contact from whence the initiating direct current signal came.

Each of the stationary contacts is coupled through an isolating capacitor to a particular stage of, in this example, a binary scaling counter network. The particular one of the cascaded stages to which a particular contact is coupled determines its effect on the output count of the counter network. For example, a signal initiated by contact of the wiper arm with a "high acceleration" contact might be coupled to a stage near the scaler output, while a "low acceleration" contact would be coupled to a stage near the scaler input. Thus the different outputs from the accelerometer are automatically weighted so that a signal resulting from an acceleration force of 8 g's may, for example, readily cause an effective count in the scaler network which is twice that which is caused by a signal resulting from an acceleration force of 4 g's.

This automatic, predetermined weighting of the signals is achieved even though the operation of the filter and pulse generator are identical irrespective of the identity of the contact from which the initiating signal came.

A point to be noted is that the contact wiper arm connection is a two-way path: first for impressing an initiating threshold signal upon the pulse generator; and then for distributing the resulting trigger pulse to a particular stage of the scaler counter. It should further be noted that in neither sense of direction of signal coupling through the contacts is there an appreciable magnitude of current flow, a typical magnitude being of the order of a few microamperes.

Further details of these and other novel features as well as additional objects and advantages of the invention and its principles of operation will become apparent and be best understood from a consideration of the following description taken in connection with the accompanying drawings which are all presented by way of an illustrative example only and in which.

With more specific reference now to the figures in detail, it is stressed that the particulars shown are by way of example and for purposes of illustrative discussion only and are presented in the cause of providing what is believed to be the most useful and readily understood description of the principles and structural concepts of the invention. In this regard, no attempt is made to show structural details of the apparatus and circuitry in more detail than is necessary for a fundamental understanding of the invention, the description taken with the drawings making apparent to those skilled in the electronic and electro-mechanical arts how the several forms of the invention may be embodied in practice. Specifically, the detailed showing is not to be taken as a limitation upon the scope of the invention which is defined by the appended claims forming, along with the drawings, a part of the specification.

Figure 1:
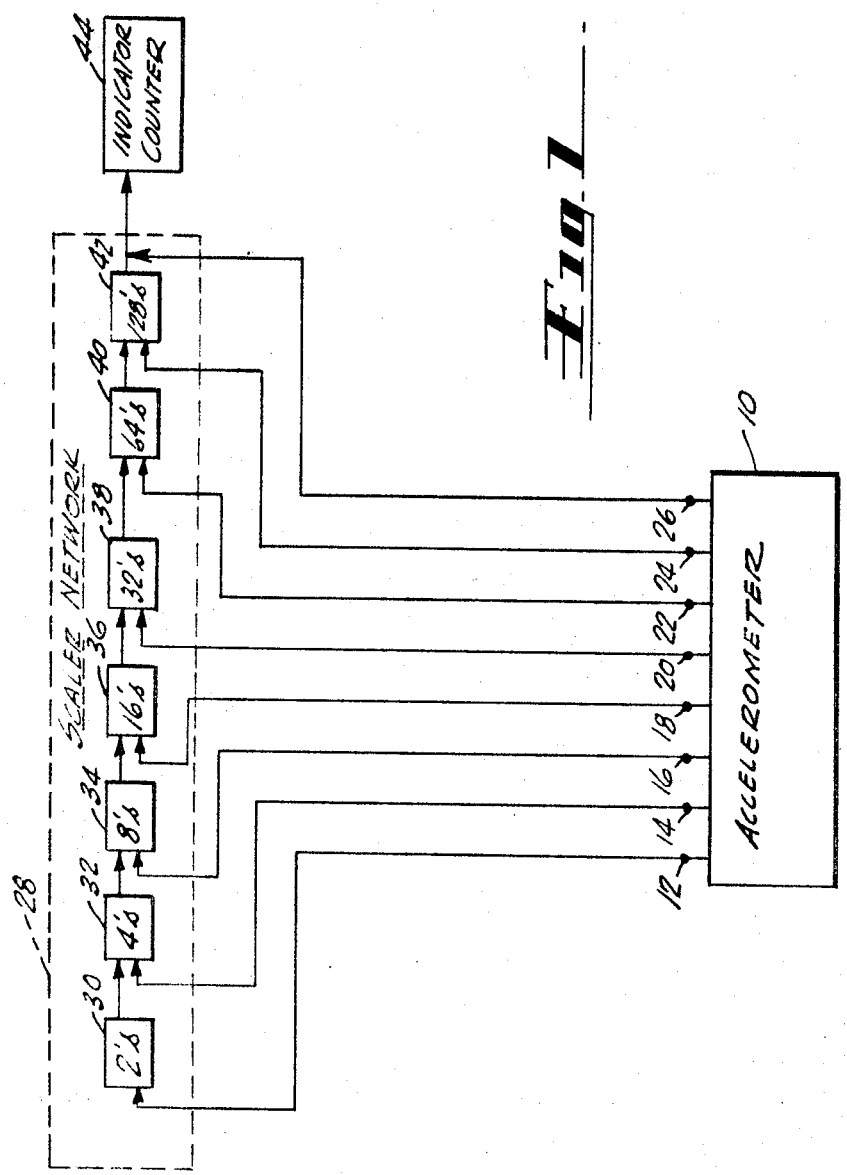
FIGURE 1 is a block diagram of an example of a threshold summation system constructed in accordance with the principles of the present invention.

Referring to FIGURE 1, an accelerometer 10 is indicated as being of the character having a plurality of output terminals 12, 14, 16, 18, 20, 22, 24, 26. It is contemplated that the accelerometer of this example is mounted upon a stressed member such as the wing spar of an aircraft which may be either undergoing stress analysis testing or may be an aircraft in service which is being monitored for service life. In accordance with the instrumentation of this example, the accelerometer 10 provides an output pulse at a particular one of the output terminals 12–26 whenever the stressed member suffers an acceleration of a predetermined magnitude, the digital value of which is indicated by the particular identity of the output terminal upon which the signal occurs. It may be noted that in this general type of instrumentation, the assumption is made at the outset that the structural stresses and consequent strains of the member being observed are proportional or otherwise related in a known manner to the value of the acceleration sensed by the accelerometer movement mounted directly on or in the vicinity of that member.

In the example of FIGURE 1, when the accelerometer 10 is experiencing zero acceleration, no signal is provided at any of the output terminals 12–26 thereof. When, however, a relatively small acceleration is sensed, an output pulse is provided at the terminal 12. If a stronger acceleration is suffered by the structural member associated with the accelerometer, the pulse is provided at the output terminal 14; a still stronger acceleration will cause the output pulse to be provided at the output terminal 16; and so on, until the largest acceleration contemplated causes an output pulse at the terminal 26.

Each of the output terminals 12 through 26 is, in this example, coupled to the input of a different one of the stages of a scaler network 28. The network 28 includes 7 binary stages indicated in the figure as 30, 32, 34, 36, 38, 40, and 42. The stages are connected in cascade and are each of the character to provide a single output when it has received a sequence of two input signals. Each of the stages may be a bi-stable multi-vibrator or "flip-flop" circuit and, as indicated, the stage 30 has an output which counts twos; the stage 32 has an output which counts fours; the stage 34 has an output which counts eights; and so on, with the stage 42 counting 128's and being coupled to an indicator counter 44 which, in this example, may be a conventional digital register.

It may be noted that each of the scaler stages 32–42 has a pair of input terminals, one of which is connected to the output of the previous scaler in the cascaded chain of stages with the other terminal being coupled to a different one of the output terminals of the accelerometer 10. By these means, the scaler stage 36, for example, may have its counting status "flipped" either by a total sequence of 8 pulses inputted at the input terminal of the stage 30 or by a single pulse outputted at the output terminal 18 of the accelerometer 10. Similarly, as a different example, the counter stage 42 may output a pulse to the indicator counter 14 after the scaler network 28 has received a total of 128 pulses inputted at the input terminal of the stage 30 or by a single pulse coupled to the counter input from the output terminal 26 of the accelerometer. It may be seen that in this manner a pulse outputted at the terminal 26 of the accelerometer is given a weighting factor of 128 as compared to a pulse outputted from its terminal 12. In operation then the indicated counter 44 in cooperation with the scaler network 28 automatically sums and weights all signal output pulses from all of the output terminals 12–26, including any combination thereof, of the accelerometer 10.

Figure 2:
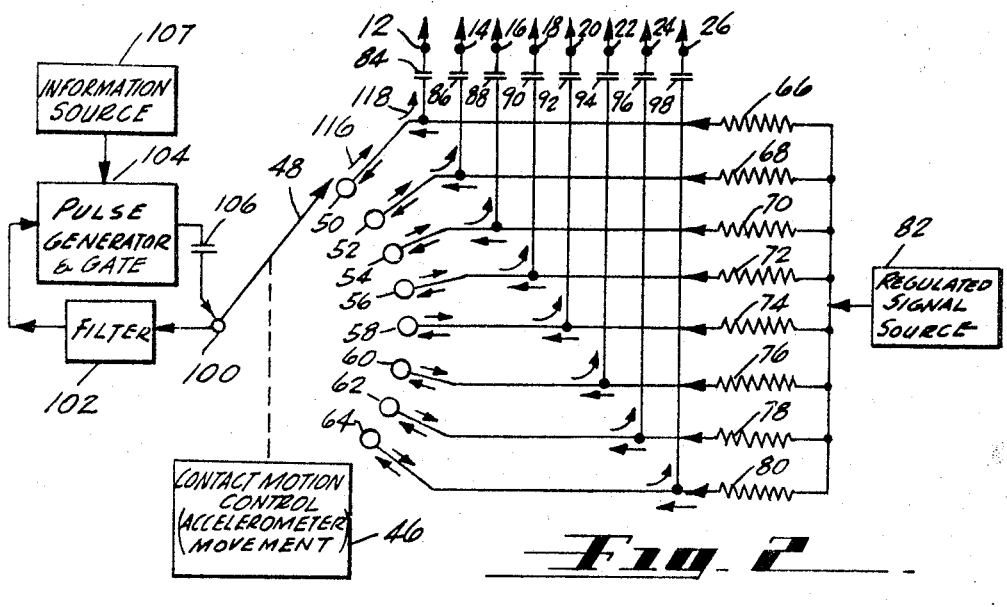
FIGURE 2 is a schematic diagram of the structure of an alternative example of the invention.

Referring to FIGURE 2, a somewhat generalized diagram of an example of the gating system of the invention is illustated. This structure may be related to that of the previous example by considering that the gating system of FIGURE 2 is an alternative exampIt of the element designated as the accelerometer 10 of FIGURE 1 which in FIGURE 2 is generalized to illustrate that the gating system may relate to and embody electric contacting mechanisms other than those of acelerometers per se. However, in order to interrelate the details of the two figures as much as possible, the description of FIGURE 2 includes certain of the accelerometer and scaler counter nomenclature and references of FIGURE 1. A contact motion control mechanism which may be an accelerometer movement 46 (as indicated by the parenthetical designation on the figure) of a conventional character which provides a self-restoring action is coupled mechanically to a conductive wiper arm 48.

When the movement 46, in the example of an accelerometer configuration, is sensing zero acceleration the wiper arm 48 as indicated may be free of contact from the series of contact positions, hereinafter referred to as "contacts," 50, 52, 54, 56, 58, 60, 62, 64. As the movement 46 senses acceleration of increasing magnitudes, however, the wiper arm 48 is swept downwardly across and in contact with different ones of the contacts 50–64 with, it is understood, a relatively small acceleration causing contact with the contact 50 while a relatively large acceleration causes a contact with the contact 64.

In this example, each of the contacts 50–64 are connected through an isolating resistor 66, 68, 70, 72, 74, 76, 78, 80, respectively, to a regulated signal source 82. In a typical example, each of the resistors 66–80 may be 5.6 kilohms and the regulated signal source 82 may be a low current capacity, 5 volt direct current Zener diode regulated source.

Each of the contact points 50–64 is also coupled respectively to a different one of the accelerometer output terminals 12–26 through an isolating coupling capacitor 84, 86, 88, 90, 92, 94, 96, 98.

The pivot point or common end 100 of the wiper arm 48 is connected to the input terminal of a filter circuit 102 which, in this example, may be a simple RC network comprising a series 5.6 kilohm resistor and a .005 microfarad shunt capacitor.

The output terminal of the filter 102 is in turn connected to the input terminal of a pulse generator and gate network 104. The pulse generator gate network is of the character to function as a threshold sensor and, in response to a predetermined step function or direct current voltage signal, outputs a relatively narrow, fast rise time counter pulse which is, in turn, coupled to a coupling capacitor 106 back to the wiper arm 48. The pulse generator gate network 104 may typically comprise a substantially conventional Schmitt trigger circuit.

In general it is to be noted that the network 104, as seen by the capacitor 106, is a source of pulses or other signals. The network may in fact generate pulses as triggered by signals from the filter network 102 or, when desired, may be considered a gate or switch which effectively connects the capacitor 106 to a separate or extrinsic source 107 of information signals in response to a predetermined trigger action by the signals from the filter network 102.

Figure 3A:
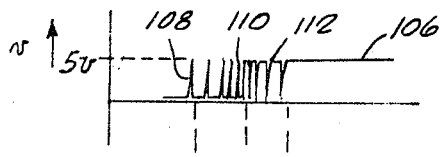
FIGURE 3 is a graph of signal level versus time, using a common time abscissa, for use in describing the operation of the network shown in the FIGURE 2.
Figure 3B:
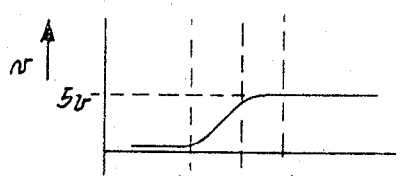
Figure 3C:
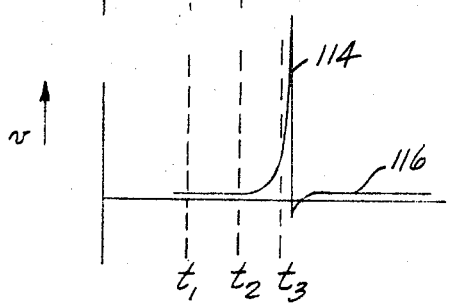

In the operation of the component combination illustrated in FIGURE 2, reference may be made to FIGURE 3 in which the curve 106 indicates the voltage on the wiper arm 48 as a consequence, for example, of the wiper arm vibrationally contacting the contact 50 due to action of the accelerometer movement 46 in sensing, in this accelerometer example of the invention, a finite but relatively low magnitude of acceleration. The voltage spikes are "noise" of approximately 5 volts magnitude and are a result of the lateral or angular vibration of the wiper arm 48, due to its effective mass and restoring force through its connection with the accelerometer movement 46, approaching the contact 50. The electrical contact is at first sporadic as indicated by the spike 108 at the time $t_1$ and then more regular at time $t_2$ as indicated by the spike 110 and is then substantially constantly in contact with the contact 50 after time $t_3$ as indicated by the portion 112 of the curve 106. It may be noted that the spacing in time between the spikes constitutes a first order measure of the resonant natural frequency of the combined wiper arm and accelerometer movement. Superimposed upon these time spacings is, of course, a number of spurious and otherwise non-linear effects.

The signal train indicated by the curve 106 is coupled to the filter network 102 which effectively integrates the pulses during the time between $t_1$ and $t_3$ (FIG. 3b) until its capacitance, in this example, is charged to the full 5 volts of the regular signal source 82. The output of that capacitance is coupled to the pulse generator network 104 which is constructed, as indicated above, to couple the source 107 to the capacitor 106 for a predetermined gating period or to provide an output pulse as indicated at 114 on the curve 116 of FIGURE 3c, when the input to the pulse generator approaches the level of a direct current voltage of 5 volts.

The pulse 114 or the information from the source 107 is then coupled through the coupling capacitor 106 back to the wiper arm 48. Since the wiper arm 48 is in contact with the contact 50, the pulse 114 or other information is coupled as indicated by the signal arrows 116 and 118 through the coupling capacitor 84 to the output terminal 12 from whence, as seen, for example, in FIGURE 1, the pulse 114 may be used to trigger a flip-flop multi-vibrator of the first stage 30 of a scaler network 28.

It is stressed that the contact between the wiper arm and one of the contacts 50 through 64 constitute a bi-directional signal path and by his means the initiating direct current signal is sent from the regulated signal source 82 through the filter 102 to cause a gating action or an output pulse from the generator network 104 to be coupled through, in this example, the same contact to the appropriate output terminal 12–26.

It may be noted (1) that the pulse generator gate network 104 does not know from which of the contacts it has received the initiating direct current signal but (2) that it does not matter since its output pulse can only be distributed, through the action of the accelerometer movement 46, to the properly identified one of the output terminals 12–26 from whence it is coupled to the appropriate stage of the scaler network 28 where in accordance with the example of FIGURE 1 automatic weighting to the signal is provided depending upon which of the output terminals of the accelerometer the signal emanates from.

There has thus been disclosed and described a number of structural aspects of an example of a gating system for eliminating contact interference and a threshold summation system which exhibit the advantages and achieve the objects set forth hereinabove.

What is claimed is:

1. An electrical system for eliminating contact interference effect comprising:
   a pair of contacts;
   a source means for providing an initiating signal output;
   means connecting the source means to one of the contacts of said pair;
   output terminal means connected to the connecting means between the source means and said one of the contacts;
   means responsive to a signal of the nature of the initiating signal output for producing a narrow fast rise time signal, having both its input and output connected to the other contact of said pair;
   means for opening and closing the pair of contacts.

2. A system according to claim 1 further including a plurality of stationary contacts to be contacted by said one of said contacts whereby to selectively distribute said fast rise time signal.

3. A system according to claim 2 wherein said means for opening and closing said pair of contacts comprises an accelerometer.

4. An electrical system for distributing well-defined pulse signals in accordance with a mechanical displacement, comprising:
   switch means including a plurality of stationary contacts and a wiper contact connected to be positioned according to said mechanical displacement;
   means for supplying a regulated control signal to said stationary contacts;
   a source of well-defined pulses for providing a pulse when actuated at a control input;
   filter means connecting said wiper contact to said control input of said source whereby to actuate said source by said control signals; and
   isolation means coupling said source of well defined pulses to said wiper contact whereby when said source is actuated a well defined pulse is provided therefrom to a select one of said stationary contacts.

5. A system according to claim 4 wherein said isolation means comprises a capacitor.

6. A system according to claim 4 further including an accelerometer to provide said mechanical displacement.

7. A system according to claim 4 further including a plurality of scalers coupled to said stationary contacts.

References Cited

UNITED STATES PATENTS

| | | | |
|---|---|---|---|
| 2,629,030 | 2/1953 | Taylor et al. | 73—517 XR |
| 2,879,053 | 3/1959 | Weaver | 73—517 |
| 3,295,364 | 1/1967 | Van Dyke | 73—517 XR |

JAMES J. GILL, *Primary Examiner.*